United States Patent [19]
Valentine

[11] 3,710,692
[45] Jan. 16, 1973

[54] BREATHING SYSTEM FOR SPRING BRAKE ACTUATOR

[75] Inventor: Harry M. Valentine, Elyria, Ohio

[73] Assignee: Bendix-Westinghouse Automotive Air Brake Company, Elyria, Ohio

[22] Filed: April 16, 1971

[21] Appl. No.: 134,697

[52] U.S. Cl. ..............................92/63, 92/64, 92/78
[51] Int. Cl................................................F01b 7/00
[58] Field of Search ...............92/63, 64, 78; 188/170

[56] References Cited

UNITED STATES PATENTS 3,406,609   10/1968   Cox .........................................92/63
3,020,094   2/1962   Murty et al...............................303/9

*Primary Examiner*—Paul E. Maslousky
*Attorney*—Scrivener, Parker, Scrivener & Clarke

[57] ABSTRACT

A combined service and spring brake actuator comprising service and spring brake chambers arranged in tandem and including a breathing system for the spring cavity during actuation of the spring brake actuator, the system including a valve construction for connecting the service chamber with the spring cavity to prevent entry of dirt and other foreign matter into the latter.

9 Claims, 4 Drawing Figures

INVENTOR
HARRY M. VALENTINE

BY *Scrivener Parker Scrivener + Clarke*
ATTORNEY

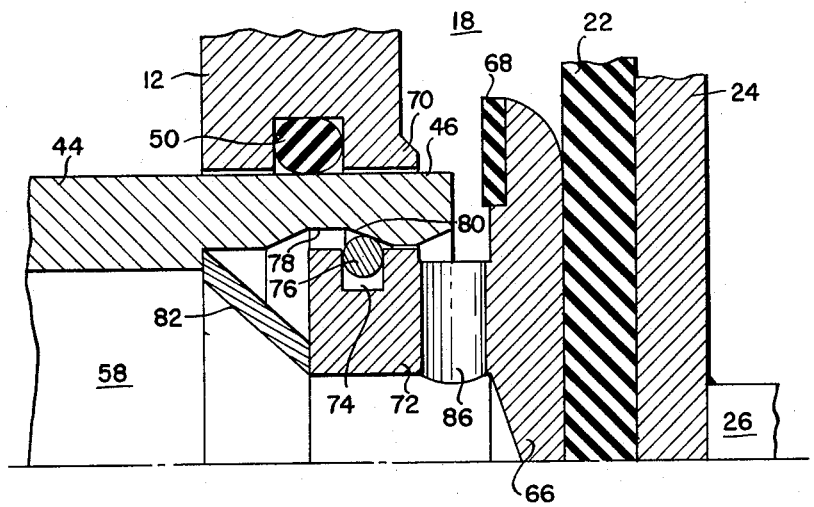
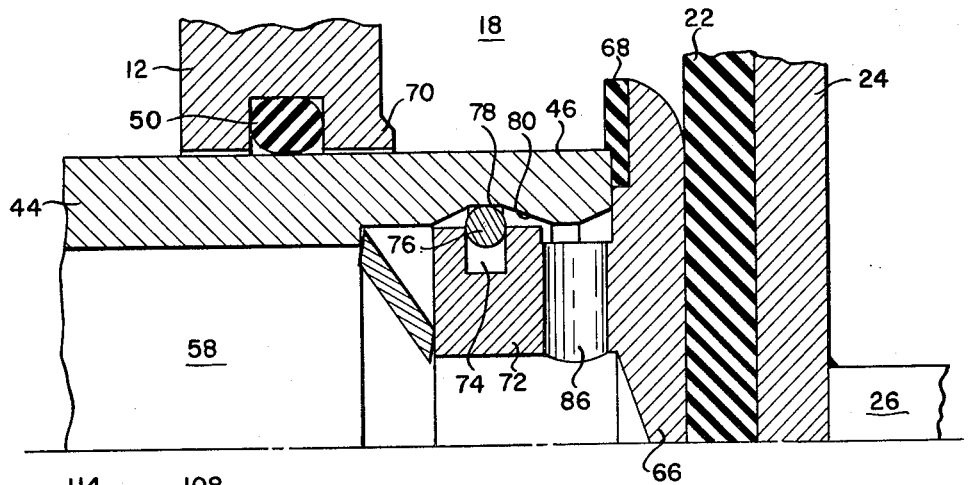
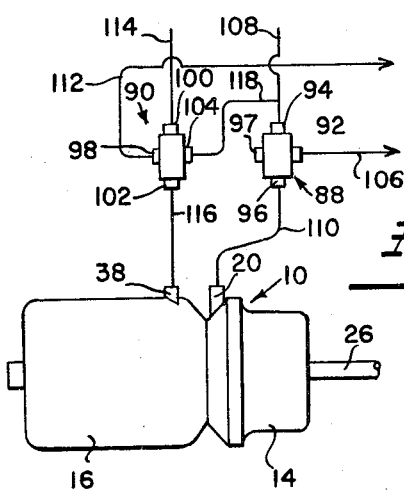
INVENTOR
HARRY M. VALENTINE 3,710,692

BREATHING SYSTEM FOR SPRING BRAKE ACTUATOR

DESCRIPTION OF THE INVENTION

Tandem service and spring brake actuators have heretofore been provided and one of the serious problems in the operation of such devices has been the accumulation of dirt and moisture within the spring cavity of the spring brake actuator. This is due to the use of open vents for the spring cavity in order to allow a flow of outside air to and from the cavity during spring brake application and release. It will be readily understood that such dirt and moisture results in rusting and deterioration of the parts of the spring actuator so that frequent servicing thereof has been necessary. While attempts have been made to solve this problem, they have not been entirely satisfactory due to complications in design.

The present invention is directed to a novel breathing system for spring brake actuators of the above type which is so constructed and arranged as to efficiently allow the flow of air from within the actuator assembly to and from the spring cavity so that dirt and moisture present in the outside air is not delivered to the latter.

Another object of the invention is to provide a breathing system of the above character which incorporates a novel valve construction for allowing air flow from the service brake chamber to and from the spring cavity during spring brake application and release.

A further object is to provide a breathing control valve which will be operative to prevent air flow from the service actuator to the spring cavity when the spring brake actuator is in either its applied or fully released position.

Other objects and novel features of the invention will appear more fully hereinafter from the following detailed description when taken in connection with the accompanying drawings illustrative of one form of the invention. It will be expressly understood however, that the drawings are not to be taken as a definition of the limits of the invention, reference being had for this purpose to the appended claims.

Referring to the drawings wherein similar reference characters denote similar parts throughout the several views:

FIG. 2 is an enlarged partial view in section of the breather valve and associated parts when the spring actuator is moved toward a brake applying position;

FIG. 3 is a view similar to FIG. 2 and illustrating the position of the parts when the spring actuator has reached its brake applying position, and FIG. 4 is a diagrammatic view of the actuator of FIG. 1 in combination with a novel valve arrangement for controlling the actuator.

Figure 1:
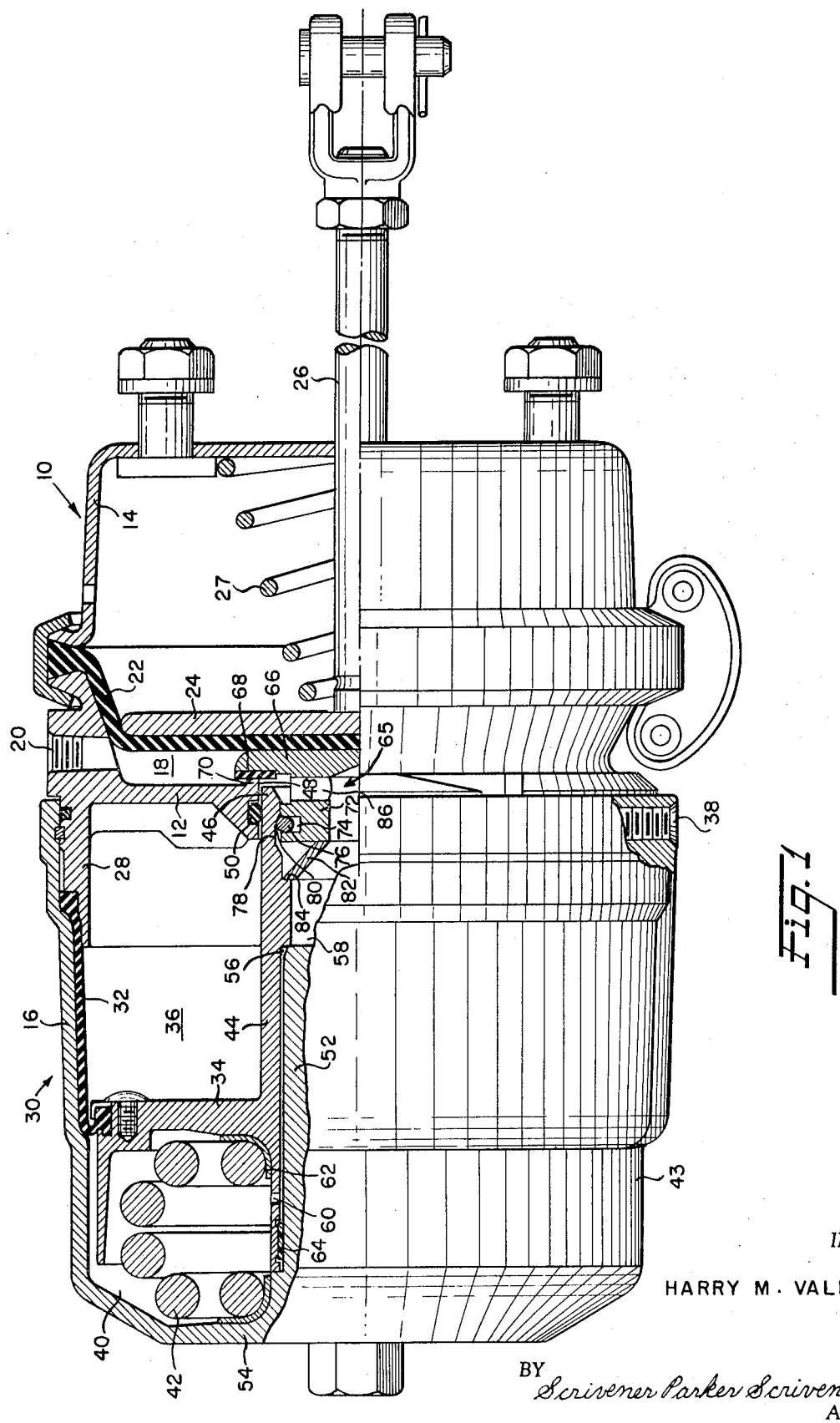
FIG. 1 is a horizontal view partly in elevation and partly in cross-section of a combined service brake and spring brake actuator incorporating the novel features of the invention.

Referring now to the drawings, the numeral 10 designates broadly the housing of a combined service brake and spring brake actuator. The housing is divided by a central wall 12 into a service actuator part 14 and a spring actuator part 16. The service part 14 includes a service pressure chamber or cavity 18 which is adapted to be connected to the usual brake pedal by way of a port 20. When service pressure is delivered to the pressure chamber 18 it operates on a diaphragm 22 to exert a brake applying force on a push plate 24 and push plate 24 and push rod 26 against the force of a return spring 27 to apply the brake in a manner well recognized in the art.

Integral with the wall 12 is a stepped lip 28 which is telescopically received within the annular opening defined by the open end of a hollow spring brake cylinder 30 which is divided by a diaphragm 32 and a piston portion 34 into a pressure chamber or cavity 36 adapted to be connected to a source of emergency fluid pressure by way of a port 38 and a spring chamber or cavity 40 containing a brake applying spring 42.

Integral with the piston 34 is a forwardly extending sleeve or shaft 44 the forward end 46 defining a brake applying abutment with the sleeve 44 being slidably and sealably received in a central opening 48 in the wall 12 separating the service and pressure cavities 18 and 36 and annularly grooved to receive an O-ring 50 which serves to seal the cavities 18, 36 from each other. As shown, a fixed sleeve 52 extends forwardly from the rear wall 54 of the cylinder 30 and is positioned within the sleeve 44 with clearance defining an annular passage 56 connecting a cavity 58 at the forward end of the sleeve 44 with the spring chamber 40 by way of a series of ports, one of which is shown at 60, said port being provided in a rearward extension 62 of sleeve 44. A suitable bearing 64 is carried by the extension 62 and engages the fixed sleeve 52.

The novel breathing valve 65 of the present invention is illustrated in FIG. 1 as including a valve plate 66 carrying an annular valve 68 normally engaging an annular seat 70 formed on the central wall 12, when the pressure chamber 36 is charged to maintain the piston 34 in inactive condition with the spring 42 compressed. The valve plate 66 is carried by the forward end 46 of the sleeve 44 and the connection between the ports is such that some relative movement between them is possible during operation of the spring piston 34 for reasons which will appear more fully hereinafter. As shown, such connection includes an extension 72 formed integrally with the valve plate 66 and provided with an annular groove 74 in which an expansible retaining ring 76 is positioned. End 46 is formed with an internal groove including a horizontal section 78 and an angular section 80, and as shown in FIG. 1, the retaining ring 76 engages the angular section 80 through the action of a conical dished spring 82 which is interposed between a shoulder 84 formed on the sleeve 44 and the extension 72. Hence, due to the connection just described, the valve 68 is maintained closed upon the seat 70 when the spring brake actuator 16 is inactive and communication between the service chamber 18 and cavity 58 by way of a series of ports in the extension 72, one of which is shown at 86, is interrupted.

During spring brake operation of the spring actuator 16, as shown in FIG. 1, it will be understood that the piston 34 and sleeve 44 will be moved to the right and the construction and operation of the breathing valve 65 is such that during such movement, the valve plate 66 and valve 68 will move away from the valve seat 70 and end 46 will remain separated from valve 68 due to the action of spring 82 in order to connect the spring chamber 40 with the service chamber 18 by way of the port 60, annular passage 56, cavity 58 and ports 86. In this manner, clean air from the vehicle braking system at atmospheric pressure will be conducted to the spring chamber 40 in order to prevent any vacuum from being formed therein during the application of the spring brake.

In addition to the above, the breathing valve 65 also functions to close communication between the service chamber 18 and the spring chamber 40 after the spring brake has been applied. Thus, in the event that the service chamber 18 is charged through operation of the usual brake valve after the spring brake has been applied, service brake pressure is prevented from entering spring cavity 40 and acting on piston 34 to compound the spring brake force. This will be clearly understood from FIG. 3 which shows the relative positions of the valve parts when the spring brake is in applied position. Therefrom, it will be seen that when the spring brakes are applied and the valve plate 66 encounters a resistance to movement exceeding the force on spring 82, the continued movement of the spring piston 34 and sleeve 44 will compress the spring 82 and cause the forward end 46 of the sleeve 44 to contact the valve 68 to remain in sealing engagement therewith. During this operation, the end portion 46 will move forwardly with respect to the valve plate 66 and the retaining ring 76 will expand and contact the horizontal section 78 as shown. It will be readily understood that when the pressure chamber 36 is again charged with fluid pressure in order to release the spring brake, the valve parts will be successively moved from the position shown in FIG. 3 to that shown in FIG. 2 to finally return to the FIG. 1 position. During this operation, the air compressed in the spring chamber 40 will pass to atmosphere by way of the service chamber 18 until the valve 68 finally reaches sealing engagement with the valve seat 70.

In the position shown in FIG. 1, it will be understood that a service application of the service actuator 10 may be effected by merely operating the usual brake valve to charge the service chamber 18 and no pressure will be lost to the spring brake actuator because of the closure of the valve 68.

Referring now to FIG. 4, the combined service and spring brake actuator 10 described above is shown therein in combination with a novel valve arrangement for controlling the application of fluid pressure to and from the service chamber 18 and the control chamber 36 of the spring actuator 16. More particularly, the valve arrangement includes a pair of valves 88 and 90 which are of the quick release type shown in U.S. Pat. No. 2,718,897 granted to Earl T. Andrews on Sept. 27, 1955 and assigned to the same assignee as the present application. Valve 88 is provided with an inlet port 92, a pair of outlet ports 94, 96 and an exhaust port 97, while the valve 90 is similarly provided with an inlet port 98, a pair of outlet ports 100, 102 and an exhaust port 104. The inlet port 92 is connected to a conventional brake valve (not shown) by a conduit 106 while the outlet ports 94 and 96 are respectively connected by conduits 108 and 110 with the service portions 14 of one or more tandem spring brake actuators constructed as heretofore described, one such actuator being shown at 10 in FIG. 4. Valve 90 has its inlet port 98 connected with a conventional spring brake parking control valve (not shown) by a conduit 112 while the outlet ports 100 and 102 of valve 90 are respectively connected by conduits 114 and 116 with the ports 38 of the spring brake portions 16 of the tandem actuators 10. The exhaust port 104 of the valve 90 is connected to the conduit 108 or 110 by a conduit 118 so that whenever the brake valve is operated to charge the conduits 108 and 112 to effect a service application of the tandem actuators 10, fluid pressure will be simultaneously conducted to the ports 38 of the spring brake actuator portions 16, assuming of course that the conduit 112 has been exhausted to allow a spring brake application of the portion 16 of the actuator 10. In this manner, as the service brake portion 14 is applied, the spring brake application is released by fluid pressure admitted to the ports 38 thus preventing a compounding of spring brake and service brake pressures.

In operation of the system shown in FIG. 4, it will be understood that the spring brake portion 16 is normally maintained in a released position by operation of the spring brake parking control valve which charges the conduit 112 and through operation of the valve 90, also charges the conduits 114 and 116. Fluid pressure thus admitted to the control cavity 36 of the actuators 10 will therefore maintain the springs 42 in a compressed and inactive condition. Normal service application of the service portion 14 may be effected by operating the brake valve to charge the conduits 108 and 110 through the valve 88. Since the exhaust port 104 of the valve 90 will be closed by the pressure at port 98, the charging of conduits 118 will have no effect. In the event however, that the spring brake control valve is moved to the park position to exhaust conduit 112, the control chamber 36 will be exhausted to atmosphere by way of the conduit 116, exhaust port 104 of valve 90, conduit 118, conduit 108 and the exhaust port 97 of the valve 88. Thus the spring 42 will be effective to apply the brakes by spring pressure and during this operation, the spring chamber 40 will be connected with the service chamber 18 by operation of the valve 65 as heretofore described in order to prevent the formation of any vacuum in the spring chamber 40.

It will also be understood that the valve arrangement of the system of FIG. 4 is such that the compounding of service and spring brake forces is prevented. For example, with the spring brake applied, as just described, a service brake application may be effected by operating the brake valve to charge the conduit 106 and conduit 110 leading to the service actuator portion 14 through the valve 88 which functions to close the exhaust 97 and connect the outlet ports 94 and 96 to the inlet port 92. Fluid pressure will also be conducted to the control chamber 36 of the spring brake portion 16 by way of the exhaust port 104 of the valve 90 and the outlet ports 100 and 102, it being understood that when fluid pressure is admitted to the exhaust port 104, the inlet port 98 of the valve 90, which was previously connected with the atmosphere, is closed. Thus, fluid pressure within the control chamber 36 will release the spring brake action as the service portion is applied and compounding of the braking forces due to spring action and service brake application will be avoided.

From the foregoing, it will be readily seen that the invention provides a novel breathing system for the spring actuator portion of a tandem spring brake and service actuator wherein initial movement of the spring actuator portion in a brake applying direction will operate the breather valve to interconnect the service chamber with the spring chamber. Thus, clean air from the service actuator will be conducted to the spring chamber to prevent the formation of any vacuum therein. The novel breather valve also closes communication between the service and spring chambers when the spring brake is fully applied thereby preventing any loss of pressure from the service actuator should the operator charge the service chamber through operation of the usual brake valve. During this latter operation, it will be understood that with the novel valve arrangement of FIG. 4, the spring brake application will be reduced in order to prevent the compounding of the spring and service pressures. Thus with the present invention, proper and efficient breathing of the spring chamber 40 is assured without the possibility of entrance thereto of any dirt, moisture or other foreign material.

While one embodiment of the invention has been shown and described herein, it will be understood that the scope thereof is to be determined by the appended claims.

What is claimed is:

1. In a tandem spring and service brake actuator for applying a vehicle brake, comprising a service actuator provided with a fluid pressure receiving chamber having a brake applying element therein, a spring actuator having a piston dividing the latter into a fluid pressure control cavity and a spring cavity, a piston rod connected with said piston and arranged to actuate the brake applying element of said service actuator to apply the brake and a spring within the spring cavity for operating said piston under predetermined operating conditions, the invention which comprises valve means for opening communication between said chamber and spring cavity during spring operation of said piston and means actuated by movement of said piston during spring operation thereof for closing said communication when said brake has been spring applied.

2. The actuator of claim 1 wherein the valve means includes an interior wall within the actuator separating the chamber and the control cavity, said piston rod comprising a hollow sleeve having a free end portion, and a valve element connected with the free end portion of said piston rod.

3. The actuator of claim 2 wherein the piston is moved to a normally inoperative position upon application of a predetermined fluid pressure to said control cavity and said valve element is moved into engagement with said wall to close said communication when the piston is in said inoperative position.

4. The actuator of claim 3 wherein the valve element includes a first part positioned within the free end portion of the piston rod and a second part engageable with said wall.

5. The actuator of claim 4 wherein a spring is interposed between the piston rod and the first valve part for normally maintaining the second valve part spaced from the end of said end portion of the piston rod.

6. The actuator of claim 5 wherein said spring compresses when the brake has been applied by spring operation of said piston in order that the end of said end portion of the piston rod may engage said second valve part to close communication between said chamber and said spring cavity.

7. The actuator of claim 4 wherein an expansible ring interconnects the first part of the valve element within the free end portion of the piston rod.

8. The actuator of claim 1 which includes means for supplying fluid pressure to said chamber and means dependent upon operation of the last named means for supplying fluid pressure to said control cavity when the brake has been applied by spring operation of said piston.

9. The actuator of claim 8 wherein the first named means includes a first valve movable to a first position to supply fluid pressure to said chamber, the second named means includes a second valve movable to a first position to supply fluid pressure to said control cavity to move the piston in a direction to compress the spring within the spring cavity and said second valve being movable to a second position to exhaust said control cavity to allow spring operation of said piston and brake applying element, and means interconnecting said first and second valves to supply fluid pressure to said control cavity when the first valve is moved to said first position and said second valve is moved to said second position.

* * * * *